United States Patent
Tang

(10) Patent No.: US 11,553,344 B2
(45) Date of Patent: Jan. 10, 2023

(54) INFORMATION TRANSMISSION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 278 days.

(21) Appl. No.: 16/760,572

(22) PCT Filed: Nov. 10, 2017

(86) PCT No.: PCT/CN2017/110521
§ 371 (c)(1),
(2) Date: Apr. 30, 2020

(87) PCT Pub. No.: WO2019/090711
PCT Pub. Date: May 16, 2019

(65) Prior Publication Data
US 2020/0260282 A1 Aug. 13, 2020

(51) Int. Cl.
*H04W 12/106* (2021.01)
*H04W 76/27* (2018.01)
(Continued)

(52) U.S. Cl.
CPC ..... *H04W 12/106* (2021.01); *H04W 12/0431* (2021.01); *H04W 12/73* (2021.01);
(Continued)

(58) Field of Classification Search
CPC .......... H04W 12/106; H04W 12/0431; H04W 12/73; H04W 76/27; H04W 80/02;
(Continued)

(56) References Cited

U.S. PATENT DOCUMENTS

2013/0148490 A1 6/2013 Yi et al.
2019/0289571 A1* 9/2019 Park .................. H04W 60/00
(Continued)

FOREIGN PATENT DOCUMENTS

CN 102142942 8/2011
CN 102448058 5/2012
(Continued)

OTHER PUBLICATIONS

3GPP TSG-RAN WG2 Meeting #99, Berlin, Germany, Aug. 21-25, 2017, Source: vivo; R2-1708414, Title: Further consideration on integrity check failure (Year: 2017).*
3GPP TSG-RAN WG2 Meeting #99, Berlin, Germany, Aug. 21-25, 2017; R2-1708134, Source: ZTE Corporation. (Year: 2017).*
(Continued)

*Primary Examiner* — Mohammed S Chowdhury
(74) *Attorney, Agent, or Firm* — Hodgson Russ LLP

(57) ABSTRACT

Provided are an information transmission method, a network device and a terminal device. The method comprises: a first network device obtains indication information, the indication information being used for indicating integrity protection (IP) check failure of data on a data radio bearer (DRB); the first network device sends the indication information to a second network device. In embodiments of the present application, by means of the indication information, the second network device can update a secret key of the terminal device during the IP check failure of data on the DRB, or the second network device can release RRC connection of the DRB. In this way, the potential safety hazard is eliminated, the communication security is ensured, and therefore, the success rate of data transmission is improved.

12 Claims, 2 Drawing Sheets

(51) Int. Cl.
  *H04W 80/02* (2009.01)
  *H04W 80/08* (2009.01)
  *H04W 12/73* (2021.01)
  *H04W 12/0431* (2021.01)
(52) U.S. Cl.
  CPC .......... *H04W 76/27* (2018.02); *H04W 80/02* (2013.01); *H04W 80/08* (2013.01)
(58) Field of Classification Search
  CPC ... H04W 80/08; H04W 12/041; H04W 28/18; H04W 76/30
  See application file for complete search history.

(56) References Cited

U.S. PATENT DOCUMENTS

| | | | | |
|---|---|---|---|---|
| 2020/0169887 | A1* | 5/2020 | Wager | H04W 76/27 |
| 2020/0205003 | A1* | 6/2020 | Ingale | H04W 12/10 |
| 2020/0296588 | A1* | 9/2020 | Yang | H04W 76/27 |
| 2020/0374961 | A1* | 11/2020 | Ingale | H04W 12/0433 |

FOREIGN PATENT DOCUMENTS

| | | |
|---|---|---|
| CN | 102821484 | 12/2012 |
| CN | 106507348 | 3/2017 |
| KR | 20130055637 | 5/2013 |
| WO | 2011113324 A1 | 9/2011 |

OTHER PUBLICATIONS

3GPP TSG-RAN WG2 Meeting #99bis; R2-1711094, Prague, Czech Republic, Oct. 9-13, 2017, Source: Huawei, HiSilicon, Title: UP integrity check failure handling in LTE-NR DC (Year: 2017).*

3GPP TSG RAN WG2#NR_AdHoc#2; R2-1706894, Qingdao, China, Jun. 27-29, 2017, Source: ZTE Corporation; Title: Consideration on MN/UE action in case of DRB integrity protection failure; (Year: 2017).*

KIPO, Office Action for KR Application No. 10-2020-7015319, dated Jun. 28, 2021.

WIPO, ISR for PCT/CN2017/110521, dated Aug. 22, 2018.

ZTE corporation, "Consideration of remaining security issues", 3GPP TSG-RAN WG2 meeting #99, R2-1708134, 6 pages, Aug. 21, 2017, Berlin, Germany.

Ericsson et al., "Integrity protection on Un", 3GPP TSG RAN WG2 #72, R2-106469, 3 pages, Nov. 15, 2010, Florida, USA.

Ericsson, "Handling of DRB integrity protection failure", 3GPP TSG-RAN WG2, NR#2, R2-1706575, 3 pages, Jun. 27, 2017, Qingdao, China.

Intel Corporation, "UE behaviour on Integrity check failure for DRBs", 3GPP TSG-RAN WG2 Meeting Ad Hoc, R2-1707032, 3 pages, Jun. 27, 2017, Qingdao, China.

EPO, Extended European Search Report for EP 17931748.2, dated Oct. 12, 2020.

Ericsson, "Security aspects of bearer harmonization", 3GPP TSG-RAN WG2 #99, R2-1708096, 2 pages, Aug. 21, 2017, Berlin, Germany.

* cited by examiner

INFORMATION TRANSMISSION METHOD, NETWORK DEVICE AND TERMINAL DEVICE

CROSS-REFERENCE TO RELATED APPLICATION

This application is a U.S. national phase application of International Application No. PCT/CN2017/110521, filed Nov. 10, 2017, the entire disclosure of which is incorporated herein by reference.

TECHNICAL FIELD

Embodiments of the present disclosure relate to the field of communications, and more specifically, to a method for transmitting information, a network device, and a terminal device.

BACKGROUND

With the pursuit of speed, latency, high-speed mobility, energy efficiency, and the diversity and complexity of business in the future, the 3rd Generation Partnership Project (3GPP) International Standards Organization started to develop the fifth-generation mobile communication technology (5-Generation, 5G). During the early deployment of New Radio (NR), it is difficult to obtain a complete NR coverage, so the typical network coverage is wide-area Long Term Evolution (LTE) coverage and NR island coverage modes. And because a large amount of LTE is deployed below 6 GHz, there is very little spectrum below 6 GHz available for 5G. Therefore, NR must study spectrum applications above 6 GHz, while high frequency bands have limited coverage and signal fading is fast.

In the related art, in order to protect mobile operators' early investment in LTE, a tight interworking working mode between LTE and NR is proposed. Specifically, the LTE-NR Dual Connection (DC) is supported through a combination of bandwidths for data transmission, thereby improving system throughput.

In LTE, there is no requirement for integrity protection of data radio bearer (DRB), but the requirement for integrity protection of data on DRB is added in NR. For this reason, each Packet Data Convergence Protocol (PDCP) service data unit (SDU) must additionally carry a Media Access Control (MAC)-I part for integrity protection (IP) verification.

However, if the IP verification fails, it is likely that the data was attacked or maliciously altered (with potential security risks). The maliciously altered data will be discarded, reducing the success rate of data transmission.

SUMMARY

Provided are a method for transmitting information, a network device and a terminal device, which can effectively eliminate hidden dangers and ensure communication security.

In a first aspect, there is provided a method for transmitting information, including:

obtaining, by a first network device, indication information, wherein the indication information is used to indicate that an integrity protection (IP) verification of data on a data radio bearer (DRB) fails; and sending, by the first network device, the indication information to a second network device.

In the embodiments of the present disclosure, by using the indication information, when the IP verification of data on the DRB fails, the second network device can update the secret key of the terminal device, or the second network device can release the RRC connection where the DRB is located. As a result, the hidden danger is eliminated, the communication security is ensured, and the success rate of data transmission is improved.

In some possible implementations, the indication information includes at least one of following information:

identification information of the DRB, a cell identification of a data packet of which the IP verification fails on the DRB, location information of a terminal device when the IP verification of the data packet on the DRB fails, and time information of the terminal device when the IP verification of the data packet on the DRB fails.

In some possible implementations, before obtaining, by the first network device, the indication information, the method further includes:

receiving, by the first network device, first uplink data sent by a terminal device on the DRB; and verifying the integrity protection (IP) of the first uplink data by a packet data convergence protocol (PDCP) layer of the first network device; and wherein obtaining, by the first network device, the indication information includes:

when the IP verification of the first uplink data fails, generating, by the first network device, the indication information.

In some possible implementations, obtaining, by the first network device, the indication information includes:

receiving, by the first network device, the indication information sent by a terminal device.

In some possible implementations, receiving, by the first network device, the indication information sent by the terminal device includes:

receiving, by the first network device, radio resource control (RRC) signaling sent by the terminal device, the RRC signaling comprising the indication information.

In some possible implementations, receiving, by the first network device, the indication information sent by the terminal device includes:

receiving, by the first network device, a media access control (MAC) control element (CE) sent by the terminal device, the MAC CE comprising the indication information.

In some possible implementations, receiving, by the first network device, the indication information sent by the terminal device includes:

receiving, by the first network device, a PDCP status report sent by the terminal device, the PDCP status report comprising the indication information.

In some possible implementations, sending, by the first network device, the indication information to the second network device includes:

sending, by the first network device, an X2/Xn message to the second network device, the X2/Xn message comprising the indication information.

In a second aspect, there is provided a method for transmitting information, including:

determining, by a second network device, whether an integrity protection (IP) verification of data on a data radio bearer (DRB) fails; and when the IP verification of the data on the DRB fails, updating, by the second network device, a secret key of a terminal device, or releasing, by the second network device, a radio resource control (RRC) connection where the DRB is located.

In some possible implementations, before determining, by the second network device, whether the integrity protection (IP) verification of the data on the data radio bearer (DRB) fails, the method further includes:

receiving, by the second network device, second uplink data sent by the terminal device on the DRB; and verifying the integrity protection (IP) of the second uplink data by a packet data convergence protocol (PDCP) layer of the second network device; wherein determining, by the second network device, whether the integrity protection (IP) verification of the data on the data radio bearer (DRB) fails includes:

determining, by the second network device, whether the integrity protection (IP) verification of the data on the DRB fails according to a verification result of the second uplink data.

In some possible implementations, before determining, by the second network device, whether the integrity protection (IP) of the data on the data radio bearer (DRB) fails, the method further includes:

receiving, by the second network device, indication information sent by the first network device or the terminal device, wherein the indication information is used to indicate that the integrity protection (IP) verification of data on the DRB fails; wherein determining, by the second network device, whether the integrity protection (IP) verification of the data on the data radio bearer (DRB) fails includes:

determining, by the second network device, whether the integrity protection (IP) verification of the data on the DRB fails according to the indication information.

In some possible implementations, the indication information includes at least one of following information:

identification information of the DRB, a cell identification of a data packet of which the IP verification fails on the DRB, location information of a terminal device when the IP verification of the data packet on the DRB fails, and time information of the terminal device when the IP verification of the data packet on the DRB fails.

In some possible implementations, receiving, by the second network device, the indication information sent by the first network device or the terminal device includes:

receiving, by the second network device, an X2/Xn message sent by the first network device, the X2/Xn message comprising the indication information.

In some possible implementations, receiving, by the second network device, the indication information sent by the first network device or the terminal device includes:

receiving, by the second network device, radio resource control (RRC) signaling sent by the terminal device, the RRC signaling comprising the indication information.

In some possible implementations, receiving, by the second network device, the indication information sent by the first network device or the terminal device includes:

receiving, by the second network device, a media access control (MAC) control element (CE) sent by the terminal device, the MAC CE comprising the indication information.

In some possible implementations, receiving, by the second network device, the indication information sent by the first network device or the terminal device includes:

receiving, by the first network device, a PDCP status report sent by the terminal device, the PDCP status report comprising the indication information.

In some possible implementations, updating, by the second network device, the secret key of the terminal device includes:

sending, by the second network device, an RRC connection reconfiguration message to the terminal device, the RRC connection reconfiguration message comprising a secret key for updating.

In some possible implementations, releasing, by the second network device, the radio resource control (RRC) connection where the DRB is located comprises:

sending, by the second network device, an RRC connection release message to the terminal device, the RRC connection release message comprising information used to instruct the terminal device to release an RRC connection where the DRB is located.

In some possible implementations, the RRC connection release message further includes:

information used to instruct the terminal device to initiate a Detach process and an Attach process in order, or information used to instruct the terminal device to initiate a tracking area update (TAU) process.

In a third aspect, there is provided a method for transmitting information, including:

generating, by a terminal device, indication information, wherein the indication information is used to indicate that an integrity protection (IP) verification of data on a data radio bearer (DRB) fails; and sending, by the terminal device, the indication information to a first network device or a second network device, the first network device and the second network device being different network devices.

In some possible implementations, the indication information includes at least one of following information:

identification information of the DRB, a cell identification of a data packet of which the IP verification fails on the DRB, location information of a terminal device when the IP verification of the data packet on the DRB fails, and time information of the terminal device when the IP verification of the data packet on the DRB fails.

In some possible implementations, before generating, by the terminal device, the indication information, the method further includes:

receiving, by the terminal device, first downlink data sent by the first network device on the DRB; and verifying the integrity protection (IP) of the first downlink data by a packet data convergence protocol (PDCP) layer of the terminal device; wherein generating, by the terminal device, the indication information includes:

when the IP verification of the first downlink data fails, generating, by the terminal device, the indication information.

In some possible implementations, before generating, by the terminal device, the indication information, the method further includes:

receiving, by the terminal device, second downlink data sent by the second network device on the DRB; and verifying the integrity protection (IP) of the second downlink data by a packet data convergence protocol (PDCP) layer of the terminal device; wherein generating, by the terminal device, the indication information includes:

when the IP verification of the second downlink data fails, generating, by the terminal device, the indication information.

In some possible implementations, sending, by the terminal device, the indication information to the first network device or the second network device includes:

sending, by the terminal device, RRC signaling to the first network device or the second network device, the RRC signaling comprising the indication information.

In some possible implementations, sending, by the terminal device, the indication information to the first network device or the second network device includes:

sending, by the terminal device, a media access control (MAC) control element (CE) to the first network device or the second network device, the MAC CE comprising the indication information.

In some possible implementations, sending, by the terminal device, the indication information to the first network device or the second network device includes:

sending, by the terminal device, a packet data convergence protocol (PDCP) status report to the first network device or the second network device, the PDCP status report comprising the indication information.

In some possible implementations, the method further includes:

receiving, by the terminal device, an RRC connection reconfiguration message sent by the second network device, the RRC connection reconfiguration message comprising a secret key for updating.

In some possible implementations, the method further includes:

receiving, by the terminal device, an RRC connection release message sent by the second network device, the RRC connection release message comprising information used to instruct the terminal device to release an RRC connection where the DRB is located.

In some possible implementations, the RRC connection release message further includes:

information used to instruct the terminal device to initiate a Detach process and an Attach process in order, or information used to instruct the terminal device to initiate a tracking area update (TAU) process.

a processing unit, configured to obtain indication information, wherein the indication information is used to indicate that an integrity protection (IP) verification of data on a data radio bearer (DRB) fails; and a transceiver unit, configured to send the indication information to a second network device.

In a fifth aspect, there is provided a network device, including:

a processor, configured to obtain indication information, wherein the indication information is used to indicate that an integrity protection (IP) verification of data on a data radio bearer (DRB) fails; and a transceiver, configured to send the indication information to the second network device.

In a sixth aspect, there is provided a terminal device, including:

a generating unit, configured to generate indication information, wherein the indication information is used to indicate that an integrity protection (IP) verification of data on a data radio bearer (DRB) fails; and a transceiver unit, configured to send the indication information to a first network device or a second network device, the first network device and the second network device being different network devices.

In a seventh aspect, there is provided a terminal device, including:

a generator, configured to generate indication information, wherein the indication information is used to indicate that an integrity protection (IP) verification of data on a data radio bearer (DRB) fails; and a transceiver, configured to send the indication information to a first network device or a second network device, the first network device and the second network device being different network devices.

In an eighth aspect, there is provided a network device, including: a processing unit, the processing unit being configured to:

determine whether an integrity protection (IP) verification of data on a data radio bearer (DRB) fails; and when the IP verification of the data on the DRB fails, update a secret key of a terminal device, or release a radio resource control (RRC) connection where the DRB is located In a ninth aspect, there is provided a network device, including: a processor, the processor being configured to:

determine whether an integrity protection (IP) verification of data on a data radio bearer (DRB) fails; and When the IP verification of the data on the DRB fails, update a secret key of a terminal device, or release a radio resource control (RRC) connection where the DRB is located.

In a tenth aspect, there is provided a computer-readable medium for storing a computer program, the computer program including instructions for executing the method embodiments of the first aspect, the second aspect, or the third aspect described above.

In an eleventh aspect, there is provided a computer chip, including: an input interface, an output interface, at least one processor, and a memory, where the processor is configured to execute code in the memory, and when the code is executed, the processor may implement each process performed by the first network device in the method for transmitting information of the first aspect, the second aspect, or the third aspect described above.

In a twelfth aspect, there is provided a computer chip, including: an input interface, an output interface, at least one processor, and a memory, where the processor is configured to execute code in the memory, and when the code is executed, the processor may implement each process performed by the second network device in the method for transmitting information of the first aspect or the second aspect or the third aspect described above.

In a thirteenth aspect, there is provided a computer chip, including: an input interface, an output interface, at least one processor, and a memory, where the processor is configured to execute code in the memory, and when the code is executed, the processor may implement each process performed by the terminal device in the method for transmitting information of the first aspect or the second aspect or the third aspect described above.

In a fourteenth aspect, there is provided a communication system, including the foregoing network device and the foregoing terminal device.

DETAILED DESCRIPTION

Figure 1:
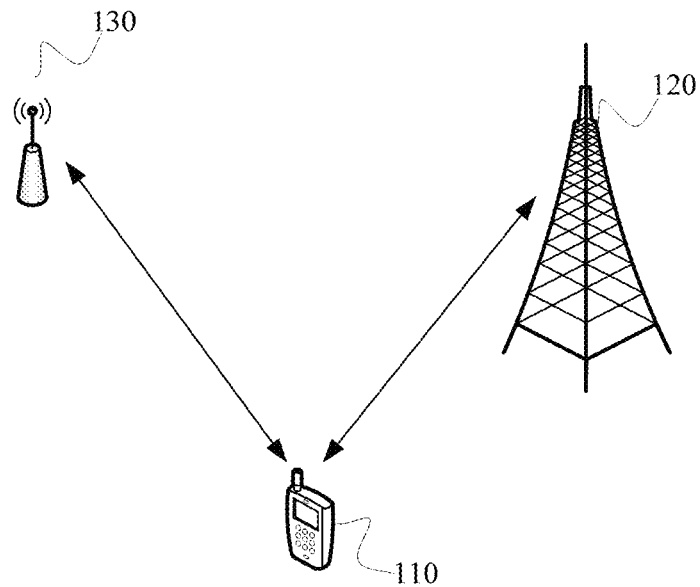
FIG. 1 is an example of an application scenario of the present disclosure.

FIG. 1 is a schematic diagram of an application scenario according to an embodiment of the present disclosure.

As shown in FIG. 1, a terminal device 110 is connected to a first network device 130 in a first communication system and a second network device 120 in a second communication system. For example, the first network device 130 is a New Radio (NR), and the second network device 120 is a network device under Long Term Evolution (LTE).

The first network device 130 and the second network device 120 may include a plurality of cells.

For ease of understanding, the following uses the first network device 130 as a network device under NR and the second network device 120 as a network device under LTE as an example for description.

In LTE, there is no requirement for integrity protection of data radio bearer (DRB), but the requirement for integrity protection of data on DRB is added to NR. For this reason, each Packet Data Convergence Protocol (PDCP) service data unit (SDU) should additionally carry a Media Access Control (MAC)-I part for integrity protection (IP) verification.

However, if the IP verification fails, it is likely that the data was attacked or maliciously altered (with potential security risks). The maliciously altered data will be discarded, thereby reducing the success rate of data transmission.

In order to solve the above problems, in the embodiments of the present disclosure, a method for transmitting information, a terminal device, and a network device are provided, which can effectively eliminate security risks, ensure communication security, and thereby improving the success rate of data transmission.

It should be understood that FIG. 1 is an example of a scenario according to an embodiment of the present disclosure, and the embodiment of the present disclosure is not limited to that shown in FIG. 1.

For example, the communication system adapted in the embodiments of the present disclosure may at least include a plurality of network devices under the first communication system and/or a plurality of network devices under the second communication system.

For another example, the first communication system and the second communication system in the embodiments of the present disclosure may be different or the same.

For example, the first communication system and the second communication system may be various communication systems, such as a Global System of Mobile communication (GSM) system, a Code Division Multiple Access (CDMA) system, Wideband Code Division Multiple Access (WCDMA) system, General Packet Radio Service (GPRS), a Long Term Evolution (LTE) system, LTE Time Division Duplex (TDD), a Universal Mobile Telecommunication System (UMTS), etc, and for another example, a 5G communication system, in which the main application scenarios of 5G may include: Enhanced Mobile Broadband (eMBB), Ultra-Reliable and Low Latency Communication (URLLC), and massive machine type of communication (mMTC).

In addition, the present disclosure describes various embodiments in conjunction with a network device (the first network device 130 and the second network device 120) and the terminal device 110.

The network device may refer to any entity that is used to send or receive signals on the network side. For example, it may be user equipment of machine type communication (MTC), a Base Transceiver Station (BTS) in GSM or CDMA, a base station (NodeB) in WCDMA, an Evolutionary Node B (eNB or eNodeB) in LTE, base station equipment in 5G networks, etc.

The terminal device 110 may be any terminal device. Specifically, the terminal device may communicate with one or more Core Networks via a Radio Access Network (RAN), and may be referred to as an access terminal, user equipment (UE), and a user unit, a user station, a mobile station, a mobile stage, a remote station, a remote terminal, a mobile device, a user terminal, a terminal, a wireless communication device, a user agent, or a user device. For example, it may be a cellular phone, a cordless phone, a Session Initiation Protocol (SIP) phone, a Wireless Local Loop (WLL) station, a Personal Digital Assistant (PDA), a handheld device and a computing device having wireless communication function, or other processing devices connected to a wireless modem, an in-vehicle device, a wearable device, and a terminal device in the 5G network.

Figure 2:
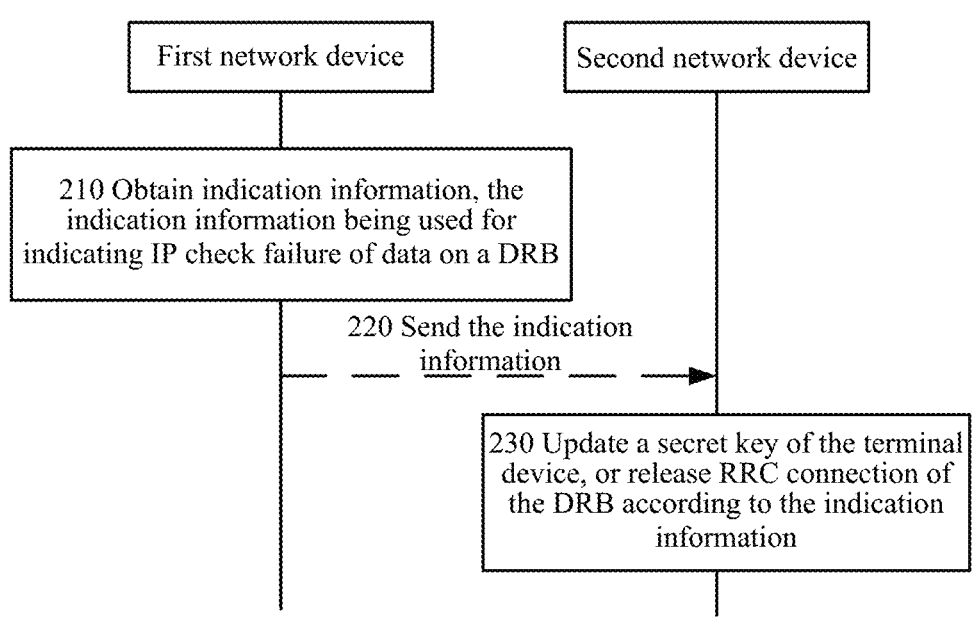
FIG. 2 is a schematic block diagram of a method for transmitting information according to an embodiment of the present disclosure.

FIG. 2 is a schematic flowchart of a method for configuring a wireless resource according to an embodiment of the present disclosure.

In 210, the first network device obtains indication information, where the indication information is used to indicate that an IP verification of data on DRB fails.

In 220, the first network device sends the indication information to the second network device.

In 230, the second network device updates a secret key of the terminal device or releases a Radio Resource Control (RRC) connection where the DRB is located according to the indication information.

It should be understood that the first network device may be the first network device 130 as shown in FIG. 1, the second network device may be the second network device 120 as shown in FIG. 1, and the terminal device may be the terminal device 110 as shown in FIG. 1, but it should be understood that embodiments of the present disclosure are not limited thereto.

It should also be understood that it is exemplary that the second network device shown in FIG. 1 updates the secret key of the terminal device or releases the RRC connection where the DRB is located according to the indication information sent by the first network device, and the embodiments of the present disclosure are not limited thereto. For example, the second network device may directly determine based on its own information, for another example, the second network device may receive indication information sent by the terminal device, and so on.

In summary, for the second network device, the second network device determines whether the IP verification of the data on the DRB fails; and when the IP verification of the data on the DRB fails, the second network device may update the secret key of the terminal device, or the second network device may release the RRC connection where the DRB is located. As a result, the hidden danger is eliminated, the communication security is ensured, and the success rate of data transmission is improved.

Specifically, when the IP verification of the data on the DRB fails, it indicates that the data on the DRB has a hidden danger of being attacked or maliciously tampered with, and the second network device may take measures of updating the secret key of the terminal device or re-establishing the DRB (releasing the RRC connection where the DRB is located) to eliminate the security risk and ensure the communication security, thereby improving the success rate of data transmission.

For example, the terminal device may receive an RRC connection reconfiguration message sent by the second network device, and the RRC connection reconfiguration message includes a secret key for updating.

As another example, the terminal device may receive an RRC connection release message sent by the second network device, and the RRC connection release message includes information used to instruct the terminal device to release an RRC connection in which the DRB is located.

Further, the RRC connection release message may further include:

information used to instruct the terminal device to sequentially initiate a Detach process and an Attach process, or information used to instruct the terminal device to initiate a tracking area update (TAU) process. As a result, the secret key of a non-access stratum (NAS) of the terminal device can be changed.

It should be understood that the Attach process includes completing the registration process of the terminal device on the network, and completing the establishment process of default bearer of the core network (EPC) for the terminal device. The Detach process completes the logout of the terminal device on the network side and the deletion process of all EPS bearers.

Furthermore, the indication information may further include at least one of the following information:

identification information of the DRB, a cell identification of a data packet of which the IP verification fails on the DRB, location information of a terminal device when the IP verification of the data packet on the DRB fails, and time information of the terminal device when the IP verification of the data packet on the DRB fails.

Therefore, the second network device may determine, according to the indication information, related information when the terminal device is attacked, and perform related processing.

For example, the second network device may determine the DRB under attack according to the indication information, and then determine whether to release or update the secret key of the terminal device or re-establish the DRB.

As another example, the second network device may determine the DRB under attack according to the indication information, and then determine the time and/or location of the terminal device being attacked, so that the location or time period of the attacker can be analyzed, and the following process can be performed. For example, in the location or time period where the attacker frequently attacks, the secret key is regularly changed.

In the embodiments of the present disclosure, it should be noted that when the second network device determines that the IP verification of the data on the DRB fails, the second network device may update the secret key of the terminal device or the second network device may release the RRC connection where the DRB is located. However, the specific implementation manner of the second network device determining whether the IP verification of the data on the DRB fails is not limited.

Exemplary description is given below.

In one embodiment, the indication information is generated by the first network device.

Specifically, the first network device may receive first uplink data sent by the terminal device on the DRB; a Packet Data Convergence Protocol (PDCP) layer of the first network device verifies the IP of the first uplink data; and when the IP verification of the first uplink data fails, the first network device generates the indication information.

That is, the first network device may generate the indication information by checking the IP of the first uplink data, and then the indication information is sent by the first network device to the second network device, so that the second network device updates the secret key of the terminal device according to the indication information, or releases the RRC connection where the DRB is located.

In another embodiment, the indication information may be generated by the terminal device.

Specifically, before the second network device determines whether the integrity protection (IP) verification of the data on the DRB fails, it receives indication information sent by the terminal device or the first network device, where the indication information is used to indicate that the IP verification of the data on the DRB fails; so that the second network device determines whether the IP verification of the data on the DRB fails according to the indication information.

Optionally, the terminal device may send the indication information to the first network device, and then the first network device forwards the indication information to the second network device.

For example, the first network device receives RRC signaling sent by the terminal device, and the RRC signaling includes the indication information.

For another example, the first network device receives a Media Access Control (MAC) control element (CE) sent by the terminal device, and the MAC CE includes the indication information.

For another example, the first network device receives a PDCP status report sent by the terminal device, and the PDCP status report includes the indication information.

As another example, the first network device sends an X2/Xn message to the second network device, and the X2/Xn message includes the indication information. Among them, the X2 interface is an interconnection interface between e-NodeBs and supports direct transmission of data and signaling. The Xn interface is an interface between 5G Radio Access Networks (RANs).

Optionally, the terminal device may also directly send the indication information to the second network device.

For example, the second network device receives RRC signaling sent by the terminal device, and the RRC signaling includes the indication information.

For another example, the second network device receives a MAC CE sent by the terminal device, where the MAC CE includes the indication information.

For another example, the second network device receives a PDCP status report sent by the terminal device, and the PDCP status report includes the indication information.

As another example, the second network device sends an X2/Xn message to the second network device, and the X2/Xn message includes the indication information.

In another embodiment, the second network device may directly determine whether the IP verification of the data on the DRB fails.

Specifically, the second network device may receive second uplink data sent by the terminal device on the DRB; the PDCP layer of the second network device checks the IP of the second uplink data; and the second network device determines whether the integrity protection (IP) verification of the data on the DRB fails based on the verification result of the second uplink data.

The following describes an implementation manner in which the terminal device determines the indication information in the embodiment of the present disclosure.

In one embodiment, the terminal device receives the first downlink data sent by the first network device on the DRB; the PDCP layer of the terminal device verifies the IP of the first downlink data; and when the IP verification of the first downlink data fails, the terminal device generates the indication information.

In another embodiment, the terminal device receives the second downlink data sent by the second network device on the DRB; the PDCP layer of the terminal device verifies the IP of the second downlink data; and when the IP verification of the second downlink data fails, the terminal device generates the indication information.

It should be understood that, in the embodiments of the present disclosure, when the second network device determines that the IP verification of the data on the DRB fails, it initiates a secret key replacement process (for example, only changing the secret key of the terminal device, and for another example, changing the secret key directly by releasing RRC connection), but the embodiments of the present disclosure do not specifically limit the manner in which the second network device determines that the IP verification of the data on the DRB fails.

In addition, for the first network device and the terminal device, the purpose is to: send the indication information for indicating that the IP verification of the data on the DRB fails to the second network device, so that the second network device initiates the secret key replacement process according to the indication information (for example, only changing the secret key of the terminal device, and for another example, changing the secret key directly by releasing the RRC connection), but the embodiments of the present disclosure do not specifically limit the sending manner of the terminal device and the first network device.

Figure 3:
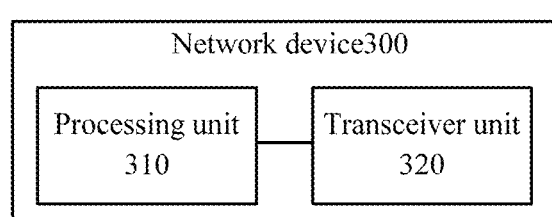
FIG. 3 is a schematic block diagram of a network device according to an embodiment of the present disclosure.

FIG. 3 is a schematic block diagram of a first network device or a second network device according to an embodiment of the present disclosure.

Specifically, a network device is provided. As shown in FIG. 3, the network device 300 includes:

a processing unit 310, configured to obtain indication information, where the indication information is used to indicate that an integrity protection (IP) verification of data on a data radio bearer (DRB) fails; and a transceiver unit 320, configured to send the indication information to the second network device.

Optionally, the indication information includes at least one of the following information:

identification information of the DRB, a cell identification of a data packet of which the IP verification fails on the DRB, location information of a terminal device when the IP verification of the data packet on the DRB fails, and time information of the terminal device when the IP verification of the data packet on the DRB fails.

Optionally, the transceiver unit 320 is further configured to:

before obtaining the indication information, receive first uplink data sent by the terminal device on the DRB; where the processing unit 310 is specifically configured to:

verify the integrity protection (IP) of the first uplink data by a packet data convergence protocol (PDCP) layer of the network device; and when the IP verification of the first uplink data fails, generate the indication information.

Optionally, the processing unit 310 is specifically configured to:

receive the indication information sent by the terminal device.

Optionally, the transceiver unit 320 is specifically configured to:

receive radio resource control (RRC) signaling sent by the terminal device, where the RRC signaling includes the indication information.

Optionally, the transceiver unit 320 is specifically configured to:

receive a media access control (MAC) control element (CE) sent by the terminal device, where the MAC CE includes the indication information.

Optionally, the transceiver unit 320 is specifically configured to:

receive a PDCP status report sent by the terminal device, where the PDCP status report includes the indication information.

Optionally, the transceiver unit 320 is specifically configured to:

send an X2/Xn message to the second network device, where the X2/Xn message includes the indication information.

As shown in FIG. 3, an embodiment of the present disclosure further provides another network device. The network device 300 includes: a processing unit 310. The processing unit 310 is configured to:

determine whether the integrity protection (IP) verification of the data on the data radio bearer (DRB) fails; and when the IP verification of the data on the DRB fails, update a secret key of the terminal device, or release a radio resource control (RRC) connection where the DRB is located.

Optionally, the terminal device further includes:

the transceiver unit 320, configured to, before determining whether the integrity protection (IP) verification of the data on the data radio bearer (DRB) fails, receive second uplink data sent by the terminal device on the DRB; where the processing unit 310 is specifically configured to:

verify the integrity protection (IP) of the second uplink data by the packet data convergence protocol (PDCP) layer of the network device, and determine whether the integrity protection (IP) verification of the data on the DRB fails according to the verification result of the second uplink data.

Optionally, the terminal device further includes:

the transceiver unit 320, configured to, before determining whether the integrity protection (IP) verification of the data on the data radio bearer (DRB) fails, receive the indication information sent by the first network device or the terminal device, where the indication information is used to indicate that the integrity protection (IP) verification of the data on the DRB fails; where the processing unit 310 is specifically configured to:

determine whether the integrity protection (IP) verification of the data on the DRB fails according to the indication information.

Optionally, the indication information includes at least one of the following information:

identification information of the DRB, a cell identification of a data packet of which the IP verification fails on the DRB, location information of a terminal device when the IP verification of the data packet on the DRB fails, and time information of the terminal device when the IP verification of the data packet on the DRB fails.

Optionally, the transceiver unit 320 is specifically configured to:

receive an X2/Xn message sent by the first network device, where the X2/Xn message includes the indication information.

Optionally, the transceiver unit 320 is specifically configured to:

receive radio resource control (RRC) signaling sent by the terminal device, where the RRC signaling includes the indication information.

Optionally, the transceiver unit 320 is specifically configured to:

receive a media access control (MAC) control element (CE) sent by the terminal device, where the MAC CE includes the indication information.

Optionally, the transceiver unit 320 is specifically configured to:

receive a PDCP status report sent by the terminal device, where the PDCP status report includes the indication information.

Optionally, the processing unit 310 is specifically configured to:

send an RRC connection reconfiguration message to the terminal device, where the RRC connection reconfiguration message includes a secret key for updating.

Optionally, the processing unit 310 is specifically configured to:

send an RRC connection release message to the terminal device, where the RRC connection release message includes information used to instruct the terminal device to release the RRC connection where the DRB is located.

Optionally, the RRC connection release message further includes:

information used to instruct the terminal device to sequentially initiate the Detach and the Attach process, or information used to instruct the terminal device to initiate the tracking area update (TAU) process.

Figure 4:
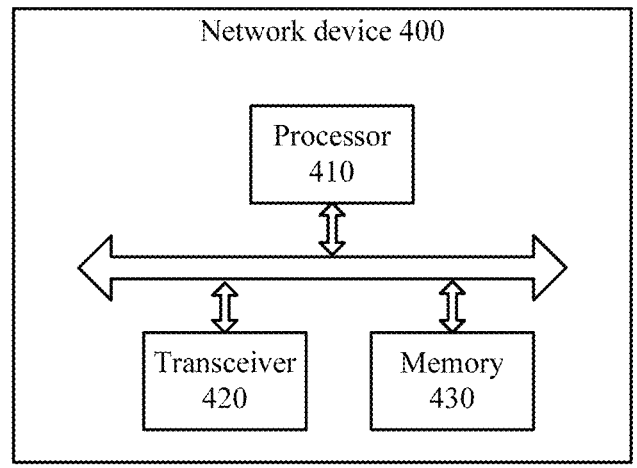
FIG. 4 is a schematic block diagram of another network device according to an embodiment of the present disclosure.

It should be noted that the processing unit 310 may be implemented by a processor, and the transceiver unit 320 may be implemented by a transceiver. As shown in FIG. 4, the network device 400 may include a processor 410, a transceiver 420, and a memory 430. The memory 430 may be used to store indication information, and may also be used to store code, instructions, and the like executed by the processor 410. The various components in the network device 400 are connected through a bus system. The bus system includes a power bus, a control bus, and a status signal bus in addition to the data bus.

The network device 400 shown in FIG. 4 can implement the processes implemented by the first network device or the second network device in the method embodiment in FIG. 2. To avoid repetition, details are not described herein again.

Figure 5:
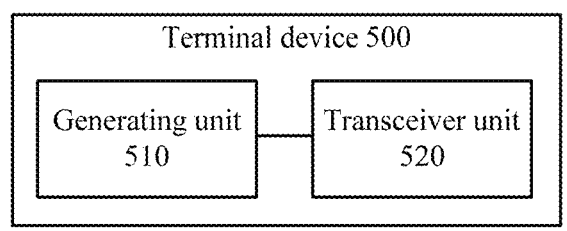
FIG. 5 is a schematic block diagram of a terminal device according to an embodiment of the present disclosure.

FIG. 5 is a schematic block diagram of a terminal device according to an embodiment of the present disclosure.

Specifically, as shown in FIG. 5, the terminal device 500 includes:

a generating unit 510, configured to generate indication information, where the indication information is used to indicate that a data integrity protection (IP) verification on a data radio bearer (DRB) fails; and a transceiver unit 520, configured to send the indication information to the first network device or the second network device, where the first network device and the second network device are different network devices.

Optionally, the indication information includes at least one of the following information:

identification information of the DRB, a cell identification of a data packet of which the IP verification fails on the DRB, location information of a terminal device when the IP verification of the data packet on the DRB fails, and time information of the terminal device when the IP verification of the data packet on the DRB fails.

Optionally, the transceiver unit 520 is further configured to:

before generating the indication information, receive first downlink data sent by the first network device on the DRB; verify the integrity protection (IP) of the first downlink data through a packet data convergence protocol (PDCP) layer of the terminal device; where the generating unit 510 is specifically configured to:

when the IP verification of the first downlink data fails, generate the indication information by the terminal device.

Optionally, the transceiver unit 520 is further configured to:

before generating the indication information, receive second downlink data sent by the second network device on the DRB; verify the integrity protection (IP) of the second downlink data through the packet data convergence protocol (PDCP) layer of the terminal device; where the generating unit 510 is specifically configured to:

when the IP verification of the second downlink data fails, generate the indication information.

Optionally, the transceiver unit 520 is specifically configured to:

send RRC signaling to the first network device or the second network device, where the RRC signaling includes the indication information.

Optionally, the transceiver unit 520 is specifically configured to:

send a media access control (MAC) control element (CE) to the first network device or the second network device, where the MAC CE includes the indication information.

Optionally, the transceiver unit 520 is specifically configured to:

send a packet data convergence protocol (PDCP) status report to the first network device or the second network device, and the PDCP status report includes the indication information.

Optionally, the transceiver unit 520 is further configured to:

receive an RRC connection reconfiguration message sent by the second network device, where the RRC connection reconfiguration message includes a secret key for updating.

Optionally, the transceiver unit 520 is further configured to:

receive an RRC connection release message sent by the second network device, where the RRC connection release message includes information used to instruct the terminal device to release an RRC connection in which the DRB is located.

Optionally, the RRC connection release message further includes:

information used to instruct the terminal device to sequentially initiate the Detach and Attach process, or information used to instruct the terminal device to initiate the tracking area update (TAU) process.

Figure 6:
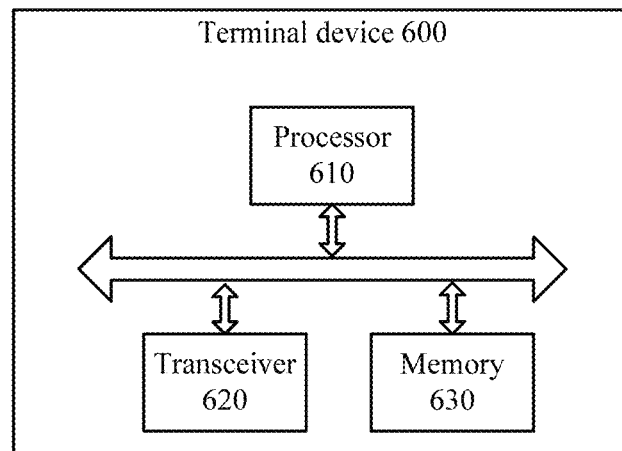
FIG. 6 is a schematic block diagram of another terminal device according to an embodiment of the present disclosure.

It should be noted that the generating unit 510 may be implemented by a processor, and the transceiver unit 520 may be implemented by a transceiver. As shown in FIG. 6, the terminal device 600 may include a processor 610, a transceiver 620, and a memory 630. The memory 630 may be used to store indication information, and may also be used to store codes, instructions and the like executed by the processor 610. The various components in the terminal device 600 are connected through a bus system. The bus system includes a power bus, a control bus, and a status signal bus in addition to the data bus.

The terminal device 600 shown in FIG. 6 can implement the processes implemented by the terminal device in the method embodiment in FIG. 2. To avoid repetition, details are not described herein again.

It should be understood that the method embodiments in the embodiments of the present disclosure may be applied to a processor or implemented by a processor.

In the implementation process, the steps in the method embodiments according to the embodiments of the present disclosure can be accomplished by the hardware integrated logic circuitry in the processor, or the instructions in form of software. More specifically, the steps in the method disclosed in conjunction with the embodiments of the present disclosure may be directly executed and completed by hardware decoding processor, or executed and completed by a combination of hardware and software modules in the decoding processor. The software module may reside in the mature storage medium in the art, such as a random access memory, a flash memory, a read only memory, a programmable read-only memory or an electrically erasable programmable memory, and a register. The storage medium is located in the memory, and the processor reads the information in the memory, and completes the steps of the method described above in conjunction with its hardware.

The processor may be an integrated circuit chip, which has a signal processing capability, and may implement or execute the methods, the steps and logic diagrams disclosed in the embodiments of the present disclosure. For example, the above processor may be a general purpose processor, a digital signal processor (DSP), an application specific integrated circuit (ASIC), a field programmable gate array (FPGA) or other programmable logic device, transistor logic device, discrete hardware component, and the like. Further, the general purpose processor may be a microprocessor or the processor may be any conventional processor or the like.

In addition, in the embodiments of the present disclosure, the memory may be a volatile memory or a non-volatile memory, or may include both volatile and non-volatile memories. The non-volatile memory may be a Read-Only Memory (ROM), a Programmable Read-Only Memory (PROM), an Erasable PROM (EPROM), an Electrically EPROM (EEPROM), or a flash memory. The volatile memory may be a Random Access Memory (RAM) that acts as an external high speed cache. It should be understood that the above memories are exemplary but not restrictive. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM), and the like. That is, the memories of the systems and methods described herein are intended to include but not limited to these and any other suitable types of memories.

Finally, it should be noted that the terminologies used in the embodiments of the present disclosure and the appended claims are for the purpose of describing particular embodiments only, and are not intended to limit the embodiments of the present disclosure.

For example, the singular forms "a", "the", and "said" used in the embodiments of the present disclosure and the appended claims are intended to include the plural forms as well, unless the context clearly indicates otherwise.

As another example, depending on the context, the word "when" as used herein may be interpreted as "if" or "in case" or "while" or "in response to determination" or "in response to detection". Similarly, depending on the context, the phrase "if determining" or "if detecting (the stated condition or event)" may be interpreted as "when determining" or "in response to determination" or "when detecting (the stated condition or event)" or "in response to detection (the stated condition or event)".

Those of ordinary skills in the art may be aware that, the units and algorithm steps of individual examples described in combination with the embodiments disclosed herein, may be implemented by electronic hardware or a combination of computer software and the electronic hardware. Whether the functions are performed by hardware or software depends on particular applications and design constraint conditions of the technical solutions. Those of ordinary skills in the art may use different methods to implement the described functions for each particular application, but it should not be considered that the implementation goes beyond the scope of the embodiments of the present disclosure.

It may be clearly understood by those of ordinary skills in the art that, for the purpose of convenient and brief description, for a detailed working process of the foregoing systems, devices, and units, reference may be made to a corresponding process in the foregoing method embodiments, and details are not described herein again.

In the several embodiments provided in the present application, it should be understood that the disclosed systems, devices and methods may be implemented in other ways. For example, the device embodiments described above are merely illustrative. For example, the division of the units is only one kind of logical function division. In practice, there may be other division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, they may be located in one place, or may be distributed on multiple network units. Some or all of the units may be selected according to actual needs to achieve the objectives of the solutions in the embodiments.

In addition, respective functional units in the embodiments of the present disclosure may be integrated in one processing unit, or respective units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the embodiments of the present disclosure, or the part contributing to the related art or a part of the technical solutions, may be embodied in the form of a software product. The computer software product is stored in a storage medium including several instructions such that a computer device (which may be a personal computer, a server, or a network device, etc.) performs all or a part of steps of the method described in the embodiments of the present disclosure. The foregoing storage medium includes: any medium that is capable of storing program codes such as a USB disk, a mobile hard disk, a Read-Only Memory (ROM), a Random Access Memory (RAM), a magnetic disk, or an optical disk.

The foregoing descriptions are merely detailed implementations of the embodiments of the present disclosure, and the protection scope of the embodiments of the present disclosure is not limited thereto. Any person skilled in the art can easily think of changes or substitutions within the technical scope disclosed by the embodiments of the present disclosure, and all the changes or substitutions should be covered by the protection scope of the embodiments of the present disclosure. Therefore, the protection scope of the embodiments of the present disclosure should be subjected to the protection scope of the claims.

What is claimed is:

1. A method for transmitting information, comprising:
generating, by a terminal device, indication information, wherein the indication information is used to indicate that an integrity protection (IP) verification of data on a data radio bearer (DRB) fails; and
sending, by the terminal device, the indication information to a first network device or a second network device, the first network device and the second network device being different network devices;
receiving, by the terminal device, an RRC connection release message sent by the second network device, the RRC connection release message comprising information used to instruct the terminal device to release an RRC connection where the DRB is located;
wherein the indication information comprises:
a cell identification of a data packet of which the IP verification fails on the DRB, location information of the terminal device when the IP verification of the data packet on the DRB fails, and time information of the terminal device when the IP verification of the data packet on the DRB fails;
wherein the RRC connection release message further comprises:
information used to instruct the terminal device to initiate a Detach process and an Attach process sequentially.

2. The method according to claim 1, wherein before generating, by the terminal device, the method further comprises:
receiving, by the terminal device, first downlink data sent by the first network device on the DRB; and
verifying the integrity protection (IP) of the first downlink data by a packet data convergence protocol (PDCP) layer of the terminal device; and
when the IP verification of the first downlink data fails, generating, by the terminal device, the indication information.

3. The method according to claim 1, wherein before generating, by the terminal device, the method further comprises:
receiving, by the terminal device, second downlink data sent by the second network device on the DRB; and
verifying the integrity protection (IP) of the second downlink data by a packet data convergence protocol (PDCP) layer of the terminal device; and
when the IP verification of the second downlink data fails, generating, by the terminal device, the indication information.

4. The method according to claim 1, further comprising one of the following:
sending, by the terminal device, RRC signaling to the first network device or the second network device, the RRC signaling comprising the indication information;
sending, by the terminal device, a media access control (MAC) control element (CE) to the first network device or the second network device, the MAC CE comprising the indication information; and
sending, by the terminal device, a packet data convergence protocol (PDCP) status report to the first network device or the second network device, the PDCP status report comprising the indication information.

5. The method according to claim 1, further comprising:
receiving, by the terminal device, an RRC connection reconfiguration message sent by the second network device, the RRC connection reconfiguration message comprising a secret key for updating.

6. A network device, comprising:
a processor, configured to obtain indication information, wherein the indication information is used to indicate that an integrity protection (IP) verification of data on a data radio bearer (DRB) fails; and
a transceiver, configured to send the indication information to a second network device;
wherein the processor is configured to send an RRC connection release message, the RRC connection release message comprising information used to instruct a terminal device to release an RRC connection where the DRB is located;
wherein the indication information comprises:
a cell identification of a data packet of which the IP verification fails on the DRB, location information of the terminal device when the IP verification of the data packet on the DRB fails, and time information of the terminal device when the IP verification of the data packet on the DRB fails;
wherein the RRC connection release message further comprises:
information used to initiate a Detach process and an Attach process sequentially.

7. The network device according to claim 6, wherein the transceiver is further configured to:
before obtaining the indication information, receive first uplink data sent by the terminal device on the DRB;
wherein the processor is configured to:
verify the integrity protection (IP) of the first uplink data by a packet data convergence protocol (PDCP) layer of the network device; and
when the IP verification of the first uplink data fails, generate the indication information.

8. A terminal device, comprising:
a generator, configured to generate indication information, wherein the indication information is used to indicate that an integrity protection (IP) verification of data on a data radio bearer (DRB) fails; and
a transceiver, configured to send the indication information to a first network device or a second network device, the first network device and the second network device being different network devices;
wherein the terminal device is configured to receive an RRC connection release message sent by the second network device, the RRC connection release message comprising information used to instruct the terminal device to release an RRC connection where the DRB is located;
wherein the indication information comprises:
a cell identification of a data packet of which the IP verification fails on the DRB, location information of the terminal device when the IP verification of the data packet on the DRB fails, and time information of the terminal device when the IP verification of the data packet on the DRB fails;

wherein the RRC connection release message further comprises:
information used to instruct the terminal device to initiate a Detach process and an Attach process sequentially.

9. The terminal device according to claim 8, wherein the transceiver is further configured to:
before generating the indication information, receive first downlink data sent by the first network device on the DRB; and
verify the integrity protection (IP) of the first downlink data by a packet data convergence protocol (PDCP) layer of the terminal device;
wherein the generator is configured to:
when the IP verification of the first downlink data fails, generate the indication information by the terminal device.

10. The terminal device according to claim 8, wherein the transceiver is further configured to:
before generating the indication information, receive second downlink data sent by the second network device on the DRB; and
verify the integrity protection (IP) of the second downlink data by a packet data convergence protocol (PDCP) layer of the terminal device;
wherein the generator is configured to:
when the IP verification of the second downlink data fails, generate the indication information.

11. The terminal device according to claim 8, wherein the transceiver is configured to perform one of the following:
send RRC signaling to the first network device or the second network device, the RRC signaling comprising the indication information;
send a media access control (MAC) control element (CE) to the first network device or the second network device, the MAC CE comprising the indication information; and
send a packet data convergence protocol (PDCP) status report to the first network device or the second network device, the PDCP status report comprising the indication information.

12. The terminal device according to claim 8, wherein the transceiver is further configured to:
receive an RRC connection reconfiguration message sent by the second network device, the RRC connection reconfiguration message comprising a secret key for updating.

\* \* \* \* \*